US012734732B2

(12) United States Patent
Stumbeck et al.

(10) Patent No.: US 12,734,732 B2
(45) Date of Patent: Sep. 15, 2026

(54) DEVICE FOR PRE-ACTIVATING AND DOSING AN ACTINICALLY CURABLE COMPOUND AND USE OF THE DEVICE

(71) Applicant: DELO Industrie Klebstoffe GmbH & Co. KGaA, Windach (DE)

(72) Inventors: Michael Stumbeck, Windach (DE); Martin Brendel, Windach (DE); Michael Oswald, Windach (DE); Uwe Trondt, Windach (DE); Maximilian Schlereth, Windach (DE)

(73) Assignee: Delo Industrie Klebstoffe GmbH & Co. KGaA, Windach (DE)

( * ) Notice: Subject to any disclaimer, the term of this patent is extended or adjusted under 35 U.S.C. 154(b) by 291 days.

(21) Appl. No.: 18/720,119

(22) PCT Filed: Dec. 15, 2022

(86) PCT No.: PCT/EP2022/086211

§ 371 (c)(1),
(2) Date: Jun. 14, 2024

(87) PCT Pub. No.: WO2023/111209

PCT Pub. Date: Jun. 22, 2023

(65) Prior Publication Data

US 2025/0050292 A1 Feb. 13, 2025

(30) Foreign Application Priority Data

Dec. 17, 2021 (DE) ......................... 102021133731.3

(51) Int. Cl.
*B29C 35/08* (2006.01)

(52) U.S. Cl.
CPC ................................ *B29C 35/0805* (2013.01)

(58) Field of Classification Search
CPC .......... B29C 35/0805; B29C 2035/0833; B01J 2204/007; B01J 2219/00119; B01J 4/002;
(Continued)

(56) References Cited

U.S. PATENT DOCUMENTS 4,880,662 A 11/1989 Habrich et al.
5,227,637 A 7/1993 Herold et al.
(Continued)

FOREIGN PATENT DOCUMENTS

CN 107053654 A 8/2017
DE 3702999 A1 8/1988
(Continued)

*Primary Examiner* — Kiet T Nguyen

(74) *Attorney, Agent, or Firm* — McNees Wallace & Nurick

(57) ABSTRACT

A device (10) for preactivating and dosing an actinically curable compound, in particular a polymerizable compound, is specified, comprising a dosing unit (12) for adjusting a volume flow of the curable compound, a channel (14) for guiding the curable compound to an outlet nozzle (16), and an irradiation unit (22) which emits actinic radiation for preactivating the actinically curable compound, wherein the channel (14) is radiotransparent to the actinic radiation of the irradiation unit (22) at least in a window section (15), wherein the irradiation unit (22) is assigned to the radiotransparent window section (15) of the channel (14), and wherein the device (10) has a sleeve (20) which is also at least partially made of a radiotransparent material to the actinic radiation and surrounds the channel (14) at least in the area to which the irradiation unit (22) is assigned, and wherein the device (10) has a thermally conductive holder (18) in which the channel (14) and the sleeve (20) are held, wherein the thermally conductive holder (18) circumferentially surrounds the channel (14) and the sleeve (20) and has at least one radiotransparent window (38) which is assigned
(Continued)

to the irradiation unit (22). Furthermore, a use of the device (10) with a curable compound is specified.

10 Claims, 3 Drawing Sheets

(58) Field of Classification Search
CPC . B01J 4/02; B01J 19/123; B01J 19/24; B33Y 40/10
USPC ........................................................ 250/492.1
See application file for complete search history.

(56) References Cited

U.S. PATENT DOCUMENTS

| | | | | |
|---|---|---|---|---|
| 7,322,122 | B2 | 1/2008 | Overton et al. | |
| 2003/0039749 | A1 | 2/2003 | Alcatel | |
| 2018/0106413 | A1* | 4/2018 | Kuzniar | F16L 55/18 |
| 2018/0162017 | A1* | 6/2018 | Kuzniar | B29C 35/0805 |

FOREIGN PATENT DOCUMENTS

| | | | |
|---|---|---|---|
| DE | 69122362 | T2 | 5/1997 |
| DE | 10232636 | A1 | 2/2004 |
| DE | 60305390 | T2 | 5/2007 |
| DE | 102007017842 | B4 | 12/2008 |
| EP | 0490854 | A2 | 6/1992 |
| EP | 0508046 | A1 | 10/1992 |
| WO | 2016154615 | A1 | 9/2016 |
| WO | 2019014770 | A1 | 1/2019 |

* cited by examiner

A
A
A-A
14
18
20
30
54
70
56
58
60
62
64
66
68
15

DEVICE FOR PRE-ACTIVATING AND DOSING AN ACTINICALLY CURABLE COMPOUND AND USE OF THE DEVICE

FIELD OF DISCLOSURE

The present disclosure relates to a device for pre-activating and dosing an actinically curable compound and to the use of the device with a polymerizable compound.

BACKGROUND

It is known to activate curable compounds by irradiation to initiate a curing process. One case of application is for example the so-called Flip-Chip method for the (electrical) contacting of semi-conductor elements with printed circuit boards. A pre-activatable compound is first applied to the underside of a chip which is activated by irradiation with actinic radiation. The chip can then be brought into contact within the open time with the printed circuit board and selectively with electrical conductive tracks. The final cure can be accelerated by heat. Such a method is described, for example, in DE 10 232 636 A1. A pre-activation of the compound ensures that the compound can also cure in areas which are not accessible by actinic radiation.

During the pre-activation, heat is supplied to the curable compound by the irradiation with actinic radiation. As the curable compound moves in the channel in a volume flow, the system is generally self-cooling in normal operation. However, if the viscosity of the curable compound increases, more pressure is built up in the dosing unit to be able to ensure a constant volume flow and a constant dosing volume. If the viscosity becomes too high, a pressure sensor in the dosing unit causes the latter to be switched off. If the illuminating units continue to supply heat to the system, it can no longer be removed by the volume flow. Consequently, the temperature increases significantly so that a self-ignition of the curable compound can occur.

Under unfavorable conditions, the curable compound already heats during normal operation, as a result of which a self-ignition of the curable compound may also occur. Both scenarios can lead to a damage of parts of the application device.

DE 37 02 999 A1 describes a method and a device for processing cationically polymerizable resinous compounds. The disclosure provides a device for irradiation which includes a capillary irradiation chamber and a reflector assigned thereto in the irradiation area. A cooling or any other safety measures are not described.

EP 0 508 046 A1 discloses an irradiation apparatus for polymerizable liquids. The essential feature is a pipe which is actively cooled by means of a cooling liquid and has a mixing means, which is intended to ensure the most homogeneous possible pre-activation of the polymerizable liquids. Although such a cooling is effective, it is associated with high effort and an increased space requirement.

DE 10 2007 017 842 B4 describes a device for activating a polymerizable compound the object of which is a more homogeneous irradiation and activation compared with the prior art. Safety aspects, in particular cooling, are not addressed here.

It is therefore an object of the invention to prevent a self-ignition of the curable compound, in particular without temperature sensor, in the event of a fault, and to ensure a supporting cooling during normal operation.

SUMMARY

According to example embodiments, this object is achieved by a device for preactivating and dosing an actinically curable compound, in particular a polymerizable compound. The device comprises a dosing unit for adjusting a volume flow of the curable compound, a channel for directing the curable compound to an outlet nozzle, and an irradiation unit which emits actinic radiation for preactivating the actinically curable compound. The channel is radiotranslucent to the actinic radiation of the irradiation unit at least in a window section, wherein the irradiation unit is assigned to the radiotransparent window section of the channel. The device has a sleeve which is also at least partially made of a radiotranslucent material to the actinic radiation and surrounds the channel at least in the area to which the irradiation unit is assigned. The device also has a thermally conductive holder in which the channel and the sleeve are held, wherein the thermally conductive holder circumferentially surrounds the channel and the sleeve and has at least one radiotranslucent window which is assigned to the irradiation unit.

The heat generated in the event of a fault or during normal operation can thus be transferred from the channel to the sleeve held by the thermally conductive holder, as a result of which the sleeve is at least in thermal contact with the holder. In this respect, the heat generated during the pre-activation which is transferred to the sleeve, can be dissipated via the thermally conductive holder and be released to the environment. The thermally conductive holder thus forms an (indirect) heat sink via which the heat generated during the pre-activation can be directed away from the channel as quickly as possible. The channel is thus continuously indirectly cooled. It is thus prevented that the curable compound can heat up to an ignition temperature, so that the application process can be carried out in a particularly safe and reliable manner. Downtimes and maintenance works are in particular avoided. It is not necessary, either, to take cooling pauses or similar, so that the application process can be carried out more efficiently. Furthermore, the temperature of the pre-activated compound can be maintained in a range which is optimal for the application of the compound.

The channel is for example made of a chemically inert plastic material such as polypropylene or polytetrafluoroethylene or glass. These materials have a high chemical resistance. It is in particular possible to use cost-effective mixing tubes as produced in large quantities by the enterprise Sulzer Mixpac, for example.

The further components of the device which also come into contact with the curable compound are preferably made of a material which is resistant to abrasive filling materials and chemicals.

The holder is for example made of copper, aluminum or iron. These materials have a particularly high thermal conductivity. The holder is particularly preferably made of aluminum, as aluminum is more cost-effective than copper and has a better thermal conductivity than iron.

According to one variant, the holder is made of aluminum which has a thermal conductivity of between 140 and 160 W/m*K.

Basically, the holder can be made of a material having a thermal conductivity of more than 10 W/m*K. Such a thermal conductivity ensures that the heat generated during the pre-activation can be released to a sufficient extent to the environment to maintain the curable compound below the respective ignition temperature.

The thermal conductivity of the structure preferably increases from the inside to the outside. This means that the holder has a higher thermal conductivity than the sleeve, which in turn has a higher thermal conductivity than the channel.

Due to the particularly high thermal conductivity of the holder, a gradient is generated between the channel and the holder with respect to the thermal conductivity, which favors the heat dissipation from the channel to the outside.

The channel is for example made of polypropylene with a thermal conductivity of 0.25 W/m*K, whereas the sleeve is made of a material with a thermal conductivity of at least 1 W/m*K.

According to one variant, the sleeve is a glass tube, in particular made of an optical glass.

The wall thickness of the sleeve is for example between 0.5 mm and 10 mm. The sleeve in particular has a wall thickness of at least 1 mm.

The at least one radiotransparent window of the holder is in particular a recess in the holder. The rays emitted by the irradiation unit are therefore not shielded by the holder at least in the region of the windows. The at least one window may be a recess in the material forming the holder.

The holder preferably has a plurality of radiotransparent windows which are distributed in the circumferential direction of the channel. This contributes to an irradiation of the curable compound which is as homogeneous as possible.

In the ideal case, an irradiation is carried out along the entire circumference of the channel, in particular in an homogeneous manner.

The plurality of radiotransparent windows may be provided (substantially) equidistantly with respect to the circumference of the channel, in particular the plurality of radiotransparent windows along with a fastening web of the holder.

Preferably, a mixing device is arranged in the channel, which is configured to circulate the curable compound in the channel. Due to the mixing device, a laminar flow in the channel is avoided, so that a homogeneous irradiation of all volume parts of the curable compound can occur. Specifically, the mixing generates a flow movement, as a result of which all volume parts of the curable compound are repeatedly conveyed to the inner wall of the channel and are irradiated there with a higher intensity.

The mixing device for example comprises a helical coil. Alternatively or additionally, the mixing device may include one or more flow breakers.

A gap is in particular formed between the sleeve and the channel. This allows thermal expansion of the channel.

For example, the gap between an outer wall of the channel and an inner wall of the sleeve is less than 1.0 mm, in particular less than 0.2 mm. This distance refers to a state in which the device is not in operation and is at ambient temperature. The volume of air between the channel and the sleeve is therefore very small, which provides additional protection in the event that the curable compound ignites spontaneously despite the heat dissipation through the holder. In particular, the low air volume provides an additional level of safety, as any flame that might occur would be smothered directly due to the low air volume. In addition, the distance also serves as a tolerance compensation and enables easy installation of the sleeve on the channel.

The channel can be made of a material which, due to the actinic radiation of the irradiation unit, undergoes such a thermal expansion that the channel at least partially interacts with the sleeve in a positive and/or nonpositive manner, for example at least partially (directly) rests against the sleeve, in particular then connects to the sleeve in a positive and/or nonpositive manner. In this case, heat transfer from the channel to the sleeve is improved. More precisely, the gap having an insulating effect between the channel and the sleeve disappears, at least in some areas, due to the expansion of the channel.

The channel may have a round, angular, oval or differently shaped cross-section. The cross-section for example has the shape of a triangle, a trapezoid, a rectangle, a square, a circle or an oval.

Depending on how the cross-sections of the channel and the sleeve are selected, the channel, during operation of the device, i.e. in the heated state, can lie with its outer wall against an inner wall of the sleeve over its entire surface or only in certain areas, for example in the form of at least one line contact parallel to the longitudinal axis of the channel. In this way, heat dissipation from the channel can be purposefully influenced by the choice of a geometry of the channel and the sleeve.

The sleeve can for example also have a round, angular, oval or differently shaped cross-section. In this respect, the cross-section may have the shape of a triangle, a trapezoid, a rectangle, a square, a circle or an oval.

The shape of the sleeve and the shape of the channel may be identical so that the sleeve and the channel both have a circular cross-section, for example. However, it may also be provided that the shapes are different, so that for example a channel having a triangular cross-section is received in a sleeve having a circular cross-section. Different constellations are generally conceivable with regard to the cross-sections.

The irradiation unit is for example set up to emit light having a wavelength in the range of 200 nm to 1200 nm. A reliable pre-activation of the curable compound occurs in this wavelength range. The wavelength of the light is in particular in a range between 250 nm and 1000 nm, preferably in the range between 300 nm and 800 nm. Preferred wavelengths are for example 365 nm, 400 nm or 460 nm. The wavelength used can be in a tolerance range of 10 nm. The wavelength can therefore be in a range of 355 nm to 470 nm, in particular in a range of 355 nm to 375 nm, in a range of 390 nm and 410 nm or in a range of 450 nm and 470 nm. The specifically used wavelength depends in particular on the curable compound.

According to one variant, the wavelength of the light emitted by the irradiation unit may vary during irradiation. The wavelength may be adjusted in steps, in particular between the above-mentioned ranges. A continuous transition of the wavelength used may also be provided.

According to one aspect, the material from which the channel is formed is at least partially translucent for the radiation used. For example, the material of the channel absorbs less than 50% of the radiation during an irradiation process. In this way, the curable compound is exposed to a sufficiently high radiation during dosing, and the compound present in the channel can be irradiated homogeneously.

The same applies to the sleeve surrounding the channel.

According to one embodiment, the holder holds at least a first sealing means for sealing at least one side of the gap between the channel and the sleeve. As a result, no oxygen can be drawn into the gap between the channel and the sleeve in the event of ignition of the curable compound, so that a flame is reliably smothered.

In particular, the gap is sealed on one side from below with the at least one first sealing means so that no oxygen can be drawn in from below through the gap between the channel and the sleeve.

For example, two sealing means may also be provided, which seal the gap on two sides of the sleeve or the channel.

The sealing means are in particular designed as O-rings.

The device may comprise a frame on which the holder, the dosing unit and/or the irradiation unit and/is mounted. This allows the various components to be mounted in a defined position relative to each other.

The device may have a thermally conductive coupling for coupling to a machine bed, which is formed by a mechanical connection and/or a thermally conductive compound. The heat dissipated via the holder is thus transferred to the machine bed so that the heat can be released even better to the environment.

According to example embodiments, the object is further achieved by the use of the device according to the invention with a polymerizable compound selected from the group consisting of compounds which are polymerizable cationically, radically and/or by moisture. Suitable cationically polymerizable compositions are known, for example, from DE 10 2018 131 513 A1. For example, pre-activatable compounds which cure by the exposure to moisture are known from WO 2017/220283 A1.

BRIEF DESCRIPTION OF DRAWINGS

Further advantages and features of the invention will become apparent from the description below and from the accompanying drawings, to which reference is made and in which.

DETAILED DESCRIPTION

Figure 1:
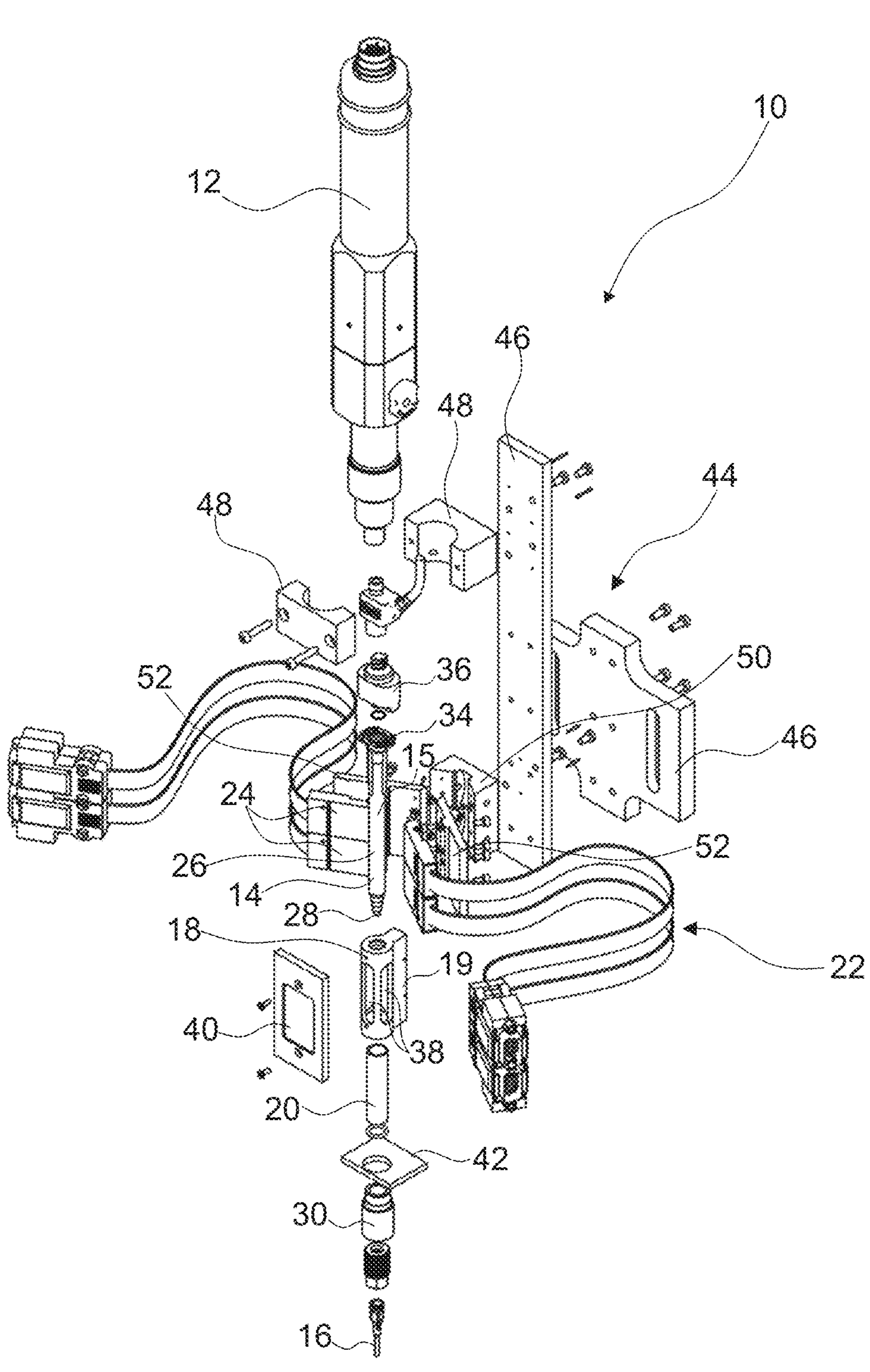
FIG. 1 shows an exploded view of a device according to the invention for preactivating and dosing an actinically curable compound.

FIG. 1 shows a device 10 for preactivating and dosing an actinically curable compound.

The curable compound is, for example, a polymerizable compound, in particular a polymerizable compound selected from the group consisting of compounds which are polymerizable cationically, radically and/or by moisture.

The device 10 is, for example, an application device by means of which the curable compound can be applied to a component to coat or encapsulate the component.

The device 10 comprises a dosing unit 12 for adjusting a volume flow of the curable compound.

The dosing can be carried out by means of an eccentric screw pump, a piston pump or by pressure-time dosing.

A flow rate is between 0.01 ml/min and 60 ml/min, for example.

Furthermore, the device 10 has a channel 14 for guiding the curable compound to an outlet nozzle 16.

The dosing unit 12 is fluidically connected to the channel 14 to feed the curable compound to the channel 14. In this respect, the channel 14 adjoins the dosing unit 12 in the flow direction of the curable compound.

The channel 14 is held in a thermally conductive holder 18, which surrounds the channel 14 circumferentially.

In the embodiment shown, the holder 18 is substantially cylindrical in shape, a web 19 extending in the longitudinal direction of the holder 18 being integrally formed on an outer side of the holder 18. The web 19 serves to align and fasten the holder 18, for example by means of connecting means such as screws.

The thermally conductive holder 18 serves in particular as a heat sink to dissipate heat from the channel 14 as quickly as possible. For this purpose, the holder 18 is made of a material having a good thermal conductivity, so that the holder 18 can be used as (indirect) cooling, as will be described below.

The device 10 also comprises a sleeve 20, which also circumferentially surrounds the channel 14 in a longitudinal section.

In addition, an irradiation unit 22 is provided which, during operation of the device 10, emits actinic radiation for preactivating the actinically curable compound.

For example, the irradiation unit 22 is set up to emit light with a wavelength in the range of 200 nm to 1200 nm.

The intensity of the irradiation unit 22 can be measured and adjusted both in the assembled state and in the removed state.

The irradiation unit 22 comprises a plurality of light heads 24, in the example embodiment four light heads 24, which are distributed in pairs in the circumferential direction of the channel 14.

Both the channel 14 and the sleeve 20 are at least partially radiotransparent to the actinic radiation of the irradiation unit 22.

In the example embodiment, the channel 14 and the sleeve 20 are made entirely of a material which is radiotransparent to the actinic radiation. In other words, the channel 14 generally forms a radiotransparent window section 15.

However, it is also conceivable that the channel 14 and/or the sleeve 20 are each only partially transparent to actinic radiation, in particular have one or more radiotransparent window sections 15.

In the example embodiment, the channel 14 runs through a tube 26, which has a round cross-section and tapers at one end towards an outlet opening 28.

The irradiation unit 22 is assigned to the radiotransparent window section or a radiotransparent area of the channel 14.

The sleeve 20 surrounds the channel 14 at least in the area to which the irradiation unit 22 is assigned.

The sleeve 20 is also held in the holder 18 and surrounded circumferentially by the latter.

To hold the channel 14 and the sleeve 20 in the holder 18, a nut 30 is screwed in at a lower end of the holder 18, which supports the channel 14 and the sleeve 20 and secures them against slipping out.

The nut 30 can be made of the same material as the holder 18.

The channel 14 is interchangeably fastened in the device 10. For this purpose, the channel 14 has a connecting geometry 34 at one end facing the dosing unit 12, which is coupled to the dosing unit 12 via a connecting piece 36.

The connecting geometry 34 forms a bayonet lock with the connecting piece 36, for example.

In the example embodiment, the holder 18 has three radiotransparent windows 38. The three radiotransparent windows 38 are arranged such that two radiotransparent windows 38 are arranged with respect to a central radiotransparent window 38 such that they both have the same distance to the central radiotransparent window 38 along the circumference of the sleeve 20.

In other words, the three radiotransparent windows 38 and the web 19 are respectively arranged equidistant from each other along the circumference of the sleeve 20.

The radiotransparent windows 38 are formed by elongated holes in the holder 18. However, differently shaped recesses are also possible.

The decisive factor is that a size and geometry of the windows 38 are adapted to the irradiation unit 22, in particular the light heads 24.

Two of the windows 38 are assigned to the irradiation unit 22, so that the irradiation unit 22 can irradiate the channel 14 or the compound located therein through the windows 38.

A further window 38, in particular the central radiotransparent window 38, serves as a viewing window and allows a view of the channel 14. A UV protective cover 40 is assigned to the viewing window.

A further UV protective cover 42 is arranged below the holder 18.

The device 10 also comprises a frame 44 on which the holder 18, the dosing unit 12 and the irradiation unit 22 are mounted.

Figure 2:
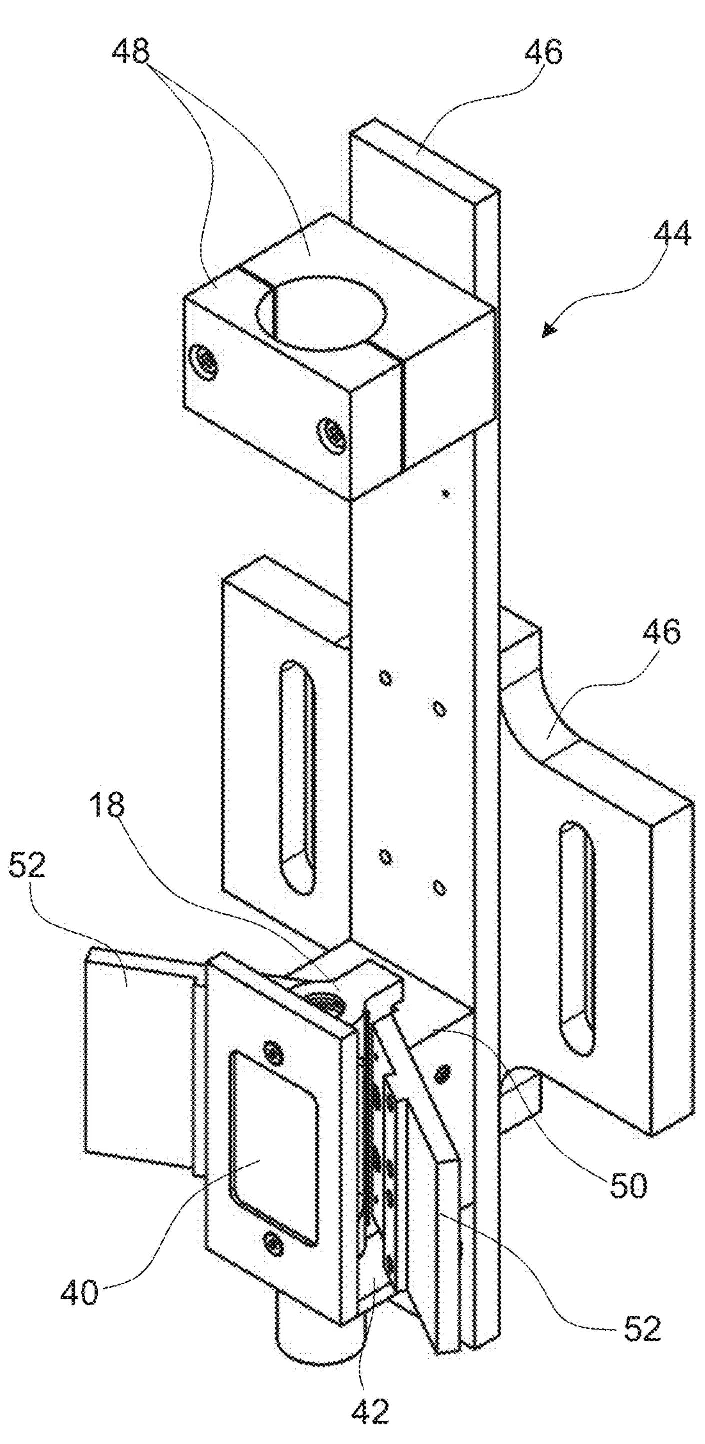
FIG. 2 shows a subassembly of the device from FIG. 1, comprising a frame.

The frame 44, which is shown along with the holder 18 and the UV protective covers 40, 42 in FIG. 2, is made up of several parts.

More precisely, the frame 44 comprises several fastening plates 46.

Two clamping elements 48 are provided for fastening the dosing unit 12, between which the dosing unit 12 is held and which in turn are fastened to one of the fastening plates 46.

The frame 44 further comprises a receiving element 50 on which the holder 18 is held and aligned.

Two fixing plates 52 for fastening the illuminated heads 24 of the irradiation unit 22 are additionally fastened to the receiving element 50.

The receiving element 50 is also fastened to a fastening plate 46.

Figures 3, 4, 5:
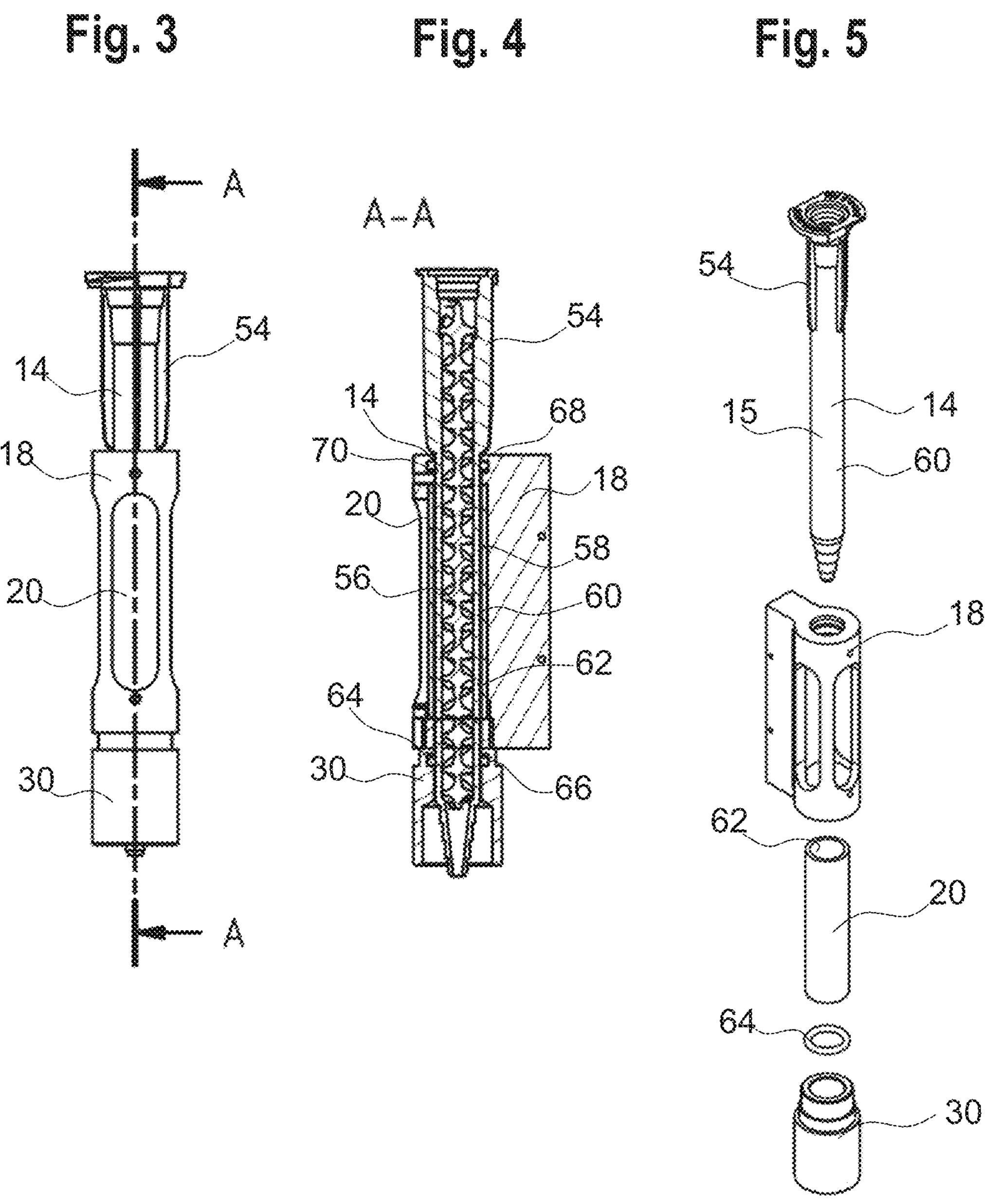
FIG. 3 shows a further subassembly of the device from FIG. 1, which comprises a channel for guiding a curable compound to an outlet nozzle.
FIG. 4 shows a sectional view of the subassembly from FIG. 3 along the line A-A in FIG. 3.
FIG. 5 shows an exploded view of the subassembly from FIG. 3.

FIGS. 3 to 5 each show a subassembly of the device 10 which comprises the channel 14, the holder 18 and the sleeve 20.

The channel 14 is longer than the holder 18 and the sleeve 20 and has positioning means 54 in the form of integrally molded ribs on the outer side thereof.

Due to the positioning means 54, it is determined how far the channel 14 can be inserted into the holder 18. It can thus be ensured that the channel 14 is aligned with respect to the radiotransparent windows 38 of the holder 18, in particular in the event that the channel 14 itself has radiotransparent window sections which have to be aligned with the radiotransparent windows 38 of the holder 18.

In the sectional view of FIG. 4, it can be seen that a mixing device 56 is arranged in the channel 14.

The mixing device 56 serves to circulate the curable compound.

FIG. 4 also shows that a gap is formed between the sleeve 20 and the channel 14.

The gap 58 is formed between an outer wall 60 of the channel 14 and an inner wall 62 of the sleeve 20.

The gap 58 is smaller than 1.0 mm, in particular smaller than 0.2 mm, in particular if the device 10 is not in operation and the channel 14 is at ambient temperature.

If the channel 14 is irradiated, it undergoes such a thermal expansion due to the actinic radiation of the irradiation unit 22, that the channel 14 cooperates at least partially in a positive and/or nonpositive manner with the sleeve 20, in particular at partially rests against the inner side thereof.

In the example embodiment, both the sleeve 20 and the channel 14 are circular-cylindrical such that the gap 58 is annular. In this respect, in the event of thermal expansion, the channel 14 comes into contact with the inner wall 62 of the sleeve 20 in a nonpositive and positive manner, as a result of which the gap 58 disappears. The gap 58 thus serves both to compensate for tolerances and as an expansion volume for the channel 14.

According to an alternative embodiment which is not shown in the figures for the sake of simplicity, the channel 14 can have an angular cross-section and the sleeve 20 a round cross-section or vice-versa. This would for example at least lead to a line contact between the channel 14 and the sleeve 20, in particular a plurality of line contacts and/or surface contacts.

As a further alternative, it is conceivable that the sleeve 20 and the channel 14 are differently round, i.e. for example that the sleeve 20 has a circular-round cross-section and the channel 14 has an oval cross-section. In case of a thermal expansion in the area of the sleeve 20, the channel 14 is then not in contact with the inner wall 62 of the sleeve 20 over the entire surface, but only in sections. In this way, heat can be purposefully dissipated in the areas in which the holder 18 has no windows 38 and ensures a good heat transfer.

Due to the low volume of the gap 58, the latter in particular constitutes a safety means in case the curable compound would ignite itself despite the high thermal conductivity of the holder 18. Specifically, any potential flame is smothered in time, in particular before the flame occurs.

The holder 18 holds a least one first sealing means 64 for sealing the gap 58 between the channel 14 and the sleeve 20.

The first sealing means 64 seals a lower end of the gap 58.

In the example embodiment, the first sealing means 64 is received in a first groove 66 of the nut 30. The first sealing means 64 can thus be easily pre-assembled and is secured against slipping upon assembly.

A second sealing means 68 is received in a second groove 70 of the holder 18 and seals an upper end of the gap 58. However, this second sealing means 68 can optionally be omitted.

The first sealing means 64 and the second sealing means 68 are configured as O-rings.

The first sealing means 64 and the second sealing means 68 contribute to the smothering of a flame which may occur. In particular, the lower first sealing means 64 received in the nut 30 significantly contributes to the fact that no oxygen is drawn into the gap 58 and the so-called chimney effect is prevented.

To additionally improve heat dissipation, the device can include a thermally conductive coupling for the coupling to a machine bed (not shown), which is formed by a mechanical connection and/or a thermally conductive compound. For example, the frame 44 constitutes such a mechanical coupling. A thermally conductive compound is not illustrated for the sake of simplicity.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A device for pre-activating and dosing an actinically curable compound, comprising:

a dosing unit for adjusting a volume flow of the curable compound, a channel for guiding the curable compound to an outlet nozzle, and an irradiation unit which emits actinic radiation for pre-activating the actinically curable compound, wherein the channel is radiotransparent to the actinic radiation of the irradiation unit at least in a window section, wherein the irradiation unit is assigned to the radiotransparent window section of the channel, and wherein the device has a sleeve which is also at least partially made of a radiotransparent material to the actinic radiation and surrounds the channel at least in the area to which the irradiation unit is assigned, and wherein the device has a thermally conductive holder in which the channel and the sleeve are held, wherein the thermally conductive holder circumferentially surrounds the channel and the sleeve and has at least one radiotransparent window which is assigned to the irradiation unit.

2. The device according to claim 1, wherein a mixing device is arranged in the channel, which is configured to circulate the curable compound in the channel.

3. The device according to claim 1, wherein a gap is formed between the sleeve and the channel.

4. The device according to claim 3, wherein the gap between an outer wall of the channel and an inner wall of the sleeve is smaller than 1.0 mm, in particular smaller than 0.2 mm.

5. The device according to claim 1, wherein the channel is made of a material which due to the actinic radiation of the irradiation unit, undergoes such a thermal expansion that the channel cooperates at least partially in a positive and/or nonpositive manner with the sleeve.

6. The device according to an claim 1, wherein the irradiation unit is set up to emit light having a wavelength in the range of 200 nm to 1200 nm.

7. The device according to claim 1, wherein the holder holds at least a first sealing device for sealing at least one side of the gap between the channel and the sleeve.

8. The device according to claim 1, wherein the device comprises a frame on which the holder, the dosing unit and/or the irradiation unit are/is mounted.

9. The device according to claim 1, wherein the device has a thermally conductive coupling for the coupling to a machine bed, which is formed by a mechanical connection and/or a thermally conductive compound.

10. Use of the device according to claim 1 a polymerizable compound which is selected from the group consisting of compounds which are polymerizable cationically, radically and/or by moisture.

* * * * *